United States Patent [19]

Hammel et al.

[11] 4,233,153

[45] Nov. 11, 1980

[54] CONTINUOUS METHOD AND APPARATUS FOR SEPARATING SOLVENT FROM SOLUTE

[75] Inventors: Harold T. Hammel, Del Mar; James E. Maggert, San Diego, both of Calif.

[73] Assignee: The Regents of the University of California, Berkeley, Calif.

[21] Appl. No.: 890,442

[22] Filed: Mar. 27, 1978

Related U.S. Application Data

[63] Continuation-in-part of Ser. No. 851,918, Nov. 21, 1977, Pat. No. 4,153,546.

[51] Int. Cl.² ............................................. B01D 17/00
[52] U.S. Cl. .................................. 203/10; 127/46 R; 159/13 R; 210/176; 202/185 R
[58] Field of Search ............... 210/22, 72, 176, 321 R, 210/502; 127/46 R; 159/13 R, 13 A, 13 B; 202/187, 236

[56] References Cited

U.S. PATENT DOCUMENTS

| | | | |
|---|---|---|---|
| 2,541,069 | 2/1951 | Jones et al. | 210/176 |
| 2,712,386 | 7/1955 | Jones et al. | 210/72 |
| 2,834,464 | 5/1958 | Fellows et al. | 210/72 |

*Primary Examiner*—Benoit Castel
*Assistant Examiner*—Ivars Cintins
*Attorney, Agent, or Firm*—Nilsson, Robbins, Dalgarn, Berliner, Carson & Wurst

[57] ABSTRACT

A method and apparatus for continuously separating a volatile solvent from a solution of the solvent and a relatively non-volatile solute at a temperature substantially below the boiling point of the solvent. The apparatus includes opposed, slightly spaced, extended surfaces across which a temperature differential is established. In an exemplification of desalination, salt water is applied along an upper edge of the warmer surface and flows downwardly by gravity. Condensate of warm vapor from the warmed salt water is formed and collects on the cooler surface and flows downwardly for subsequent collection and removal. The cooler surface can be maintained cool by application of sea water, and the warmer surface can be maintained warm by the rays of the sun or by any heated discharge whose heat would ordinarily be wasted, such as coolant from an internal combustion engine or a nuclear power reactor.

5 Claims, 7 Drawing Figures

CONTINUOUS METHOD AND APPARATUS FOR SEPARATING SOLVENT FROM SOLUTE

CROSS REFERENCE TO OTHER APPLICATIONS

This application is a continuation-in-part of our application Ser. No. 851,918, filed Nov. 21, 1977, titled METHOD AND APPARATUS FOR SEPARATING SOLVENT FROM SOLUTE, now U.S. Pat. No. 4,153,546.

FIELD OF THE INVENTION

The field of art to which the invention pertains includes methods and apparatus for solute-solvent concentration and separation.

BACKGROUND AND SUMMARY OF THE INVENTION

Techniques for the separation of a solute from a solution of the solute and a relatively non-volatile solvent are often so expensive and energy consuming that their application, on a large scale, is limited to the production of substances whose economic, political or social value transcends the criteria of the marketplace. For example, the desalinization of sea water for the production of potable water or crop irrigation water is at present practicable only in a very few arid regions. Different approaches including distillation, electrodialysis based on ion exchange, reverse osmosis using hydrostatic pressure, or vacuum freezing cannot as yet provide a return that is generally commensurate with the required large investment of capital and energy. Material problems, such as the difficulty of fabricating durable membranes of the required separating capacity, have not yet been satisfactorily solved. In desalinization, efficiency of the various technologies is adversely affected by the need to protect machinery against corrosion and scaling and to absorb or dispose of process heat before it is added to the environment. Similar considerations impeded, in many cases, development of large scale purification, separation and concentration techniques for solutions of diverse composition.

One apparatus and method for separating a solvent from a solute is disclosed in our co-pending application Ser. No. 851,918, METHOD AND APPARATUS FOR SEPARATING SOLVENT FROM SOLUTE. This application discloses a process whereby a volatile solvent is separated from a solution containing the solvent and a non-volatile solute by establishing a temperature gradient across a solvent-absorbing and gas-entraining matrix material infiltrated with the solution. The process results in concentration of the solution near the hotter matrix surface and dilution of the solution near the cooler matrix surface. In a specific application, salt water, such as sea water, is desalinated across a matrix in which air is entrained. The salt water vaporizes somewhat and diffuses through microgaps of matrix-entrained air, the vapor then condensing near the cooler surface. This process works well under static conditions, and produces potable water from a 10° C. surface and six times concentrated sea water from a heated (60° C.) surface. However, it is now known that during continuous operation the condensing vapor absorbs the entrained air thereby requiring aeration or substitution of matrix material.

The present invention discloses an apparatus for separating a solvent from a solute at a relatively low temperature but which does not require a matrix material and which is continuous in operation without need for aeration or substitution of materials. The apparatus includes opposed, extended, relatively warm and cool surfaces spaced-apart so that a continuous vapor gap is present between the surfaces, the vapor gap being the functional equivalent of the microgaps of entrained air and/or vapor in the matrix material of our prior device described above. The solution (sea water) is disposed over the warmed surface, the volatile solvent (pure water) vaporizing somewhat as it is warmed and condenses on the cooled surface, the condensate being removed as potable water. The width of the gap is determined by the following two considerations: (1) the gap should be as small as feasible in order to minimize the diffusion distance of the solvent vapor from the warmed surface to the cooled surface, thereby permitting use of a relatively low temperature differential which can be in the range of 5° C.–80° C.; and (2) the gap must not be so narrow as to allow the solution to bridge the gap and contact the solvent condensate forming on the cooled surface.

Thus the present invention provides an apparatus for isolating a volatile solvent from a solution of the solvent and a relatively non-volatile solute, the apparatus including opposed, slightly spaced apart cool and warm extended surfaces, means for passing the solution over the warm surface, and means for recovering solvent condensate formed on the cool surface. In one embodiment of the invention, the cool surface consists of one side of a heat-conducting plate, the other side partially forming a chamber through which coolant flows. In a similar manner, the warm surface consists of one side of a heat-conducting plate, the other side partially forming a chamber through which a warming medium flows. Thus a temperature differential is continuously maintained across the entire extended surface areas.

In a particular embodiment, in order to facilitate a uniform flow of water over the respective surfaces, a thin fibrous, capillary material is disposed across each surface. In such case, the gap referred to above is that obtained between opposed layers of fibrous material. Means are provided for removal of the concentrate and for collection of the condensate. Specific embodiments of the invention include use of the apparatus aboard an ocean-going vessel whereby sea water utilized for engine cooling is also used for heating the warm surface, and ambient sea water is used for cooling the cool surface. This ordinarily wasted engine heat can thereby be utilized to provide the vessel's fresh water requirements. A further embodiment of the invention includes use of the apparatus as a combined heat exchanger-solute solvent separator in lieu of the conventional heat exchanger for condensing the steam discharged from the turbine turning an electric generator. Another embodiment of the invention discloses an apparatus for heating the warm surface by the rays of the sun and cooling the cool surface by heat radiation.

Although the specific embodiments relate to desalinization apparatus, it will be appreciated that the invention relates to the separation of any volatile solvent from a solution of the volatile solvent and a non-volatile solute. In this regard, it may be that the concentrate is of interest rather than the distillate. For example, the apparatus could be utilized to obtain maple syrup from maple sap. It will also be appreciated that both solvent and solute can be liquid as in the case of an alcohol the more volatile (solvent)—water (the less volatile solute) solution.

DETAILED DESCRIPTION

As required, detailed illustrative embodiments of the invention are disclosed herein. These embodiments exemplify the invention and are currently considered to be the best embodiments for such purpose. However, it is to be recognized that other cool and warm surface configurations, solution dispensing means, and condensate collection means can be utilized to implement the principles of the invention. Accordingly, the specific embodiments disclosed are representative in providing a basis for the claims which define the scope of the present invention.

As above indicated, the invention discloses an apparatus and method for separation of a volatile solvent from a solution of the solvent and a relatively nonvolatile solute comprising disposing the solution along a warm surface thereby partially vaporizing the volatile solvent, forming condensate from the vaporized solvent on a cool surface, and collecting the condensed solvent or collecting the concentrate therefrom. It should be appreciated that an object of the invention might be to either form a concentrated solution, such as maple syrup from maple sap, or to form a condensate, such as potable water from sea water. In the embodiments described below apparatus for separation of potable water from sea water or other salt water will be described. However, the invention is not limited to desalinization, but could be utilized to separate any volatile solvent from a solution of the solvent and a relatively nonvolatile solute provided the warm and cool surface temperatures of the apparatus are compatible with the vapor pressure of the solvent.

Figure 1:
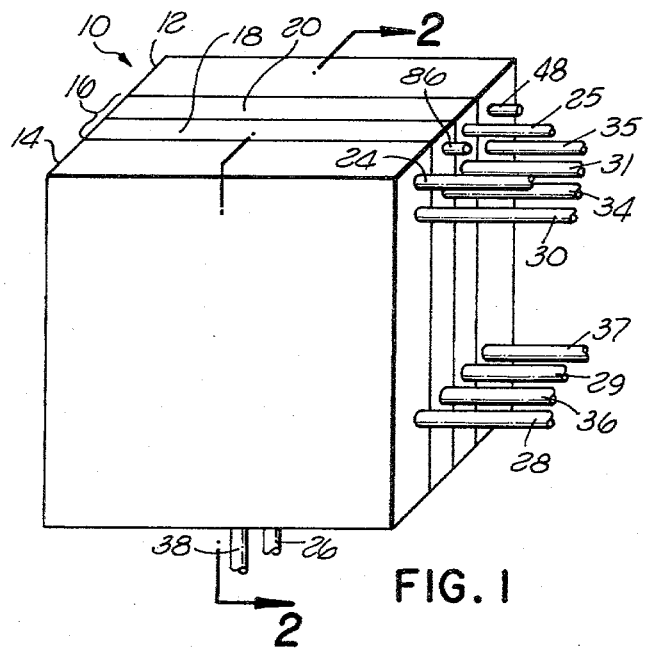
FIG. 1 is a perspective view of an apparatus according to the invention.

A desalinization apparatus 10 is shown in FIG. 1 and consists of end units 12 and 14 and a medial or added capacity assembly 16. One of the end units 12 provides a cool surface whereas the other end unit 14 provides a warm surface. The medial assembly 16 provides additional capacity in the form of a cool medial unit 18 and a warm medial unit 20, the structures of which will be explained in detail below. Salt water is introduced into the apparatus via two salt water input ducts 24 and 25, respectively, to the warm end unit 14 and to the warm medial unit 20. Water condensate formed on the surface of the cool medial unit 18 and on the surface of the cool end unit 12 is removed via two condensate drains 26 and 27, respectively. The temperature of each surface is achieved by introducing water, heated or cooled as appropriate, into a chamber formed behind the surface. Details of construction of such chambers will be given below. Thus, the temperature of the warm surfaces is maintained higher with respect to cool surfaces by introducing warm water (although steam or any other suitable warming medium could be utilized) into chambers 73 and 78 (FIG. 2) within the warm end and medial units 14 and 20 by two warm water input ducts 28 and 29, respectively, and removing the somewhat cooled warm water by two warm water output ducts 30 and 31, respectively. Likewise, the cool end and medial units 12 and 18 are maintained cooler with respect to the warm surfaces by introducing cool water via two coolant input ducts 35 and 34, respectively, and removing the somewhat warmed cool water via two coolant output ducts 37 and 36, respectively. Concentrated salt water not vaporized is removed by two salt water concentrate drains 38 and 39. Thus as one can appreciate, the desalination apparatus 10 consists essentially of alternating cool and warm surfaces, the warm surfaces having salt water flowing thereover. As the warmed salt water partially vaporizes, the thus vaporized water condenses on the cool surfaces and is removed as potable water.

In the particular embodiment shown, the apparatus 10 requires a narrow continuous gap between the salt water flowing over the warm surfaces and the potable water condensate on the cool surfaces. This gap is formed by separating adjacent heated and cooled surfaces an appropriate distance. The width of the gap is not critical. However, it should be as small as possible in order to minimize the diffusion distance of water vapor from the vaporizing surface to the condensing surface but not so narrow as to allow the salt water concentrate to bridge the gap and contact the condensate being formed on the cool surface. In a laboratory model it was found that 0.7 mm was a sufficient gap for proper operation. It is also desirable that the warm surfaces and the cool surfaces are formed from heating conducting material for reasons to be explained below.

Figure 3:
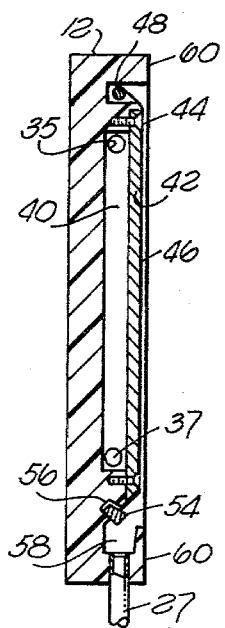
FIG. 3 is a detailed cross-sectional view of an end unit incorporating a cool surface.
Figure 2:
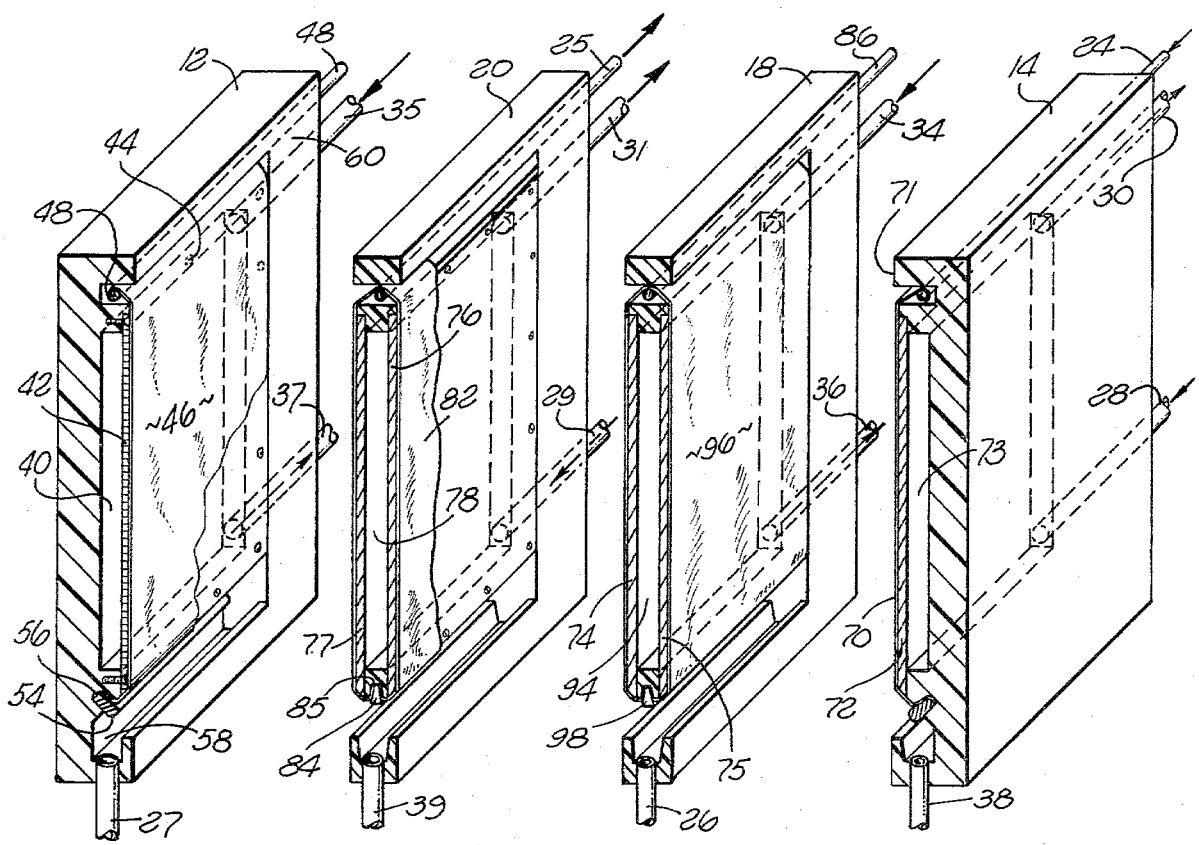
FIG. 2 is a cutaway, partially exploded view taken along line 2—2 of FIG. 1.

Details of the desalination apparatus 10 can be appreciated by referring to the partially exploded view of FIG. 2. The cool end unit 12 can be seen in both FIGS. 2 and 3. The end unit 12 is formed of PVC material, the center inside portion of which forms a chamber 40 which is closed by a nickel-plated brass cooling plate 42, the outer surface of which comprises one of the cooled surfaces. The plate 42 material is selected for its heat-conducting properties. The cooling plate 42 is secured to the chamber 40 perimeter by a plurality of mounting screws 44 countersunk so that their surfaces are flush with the surface of the cooling plate 42. A suitable sealing compound is also disposed between the plate 42 perimeter and the chamber 40 perimeter to ensure that liquid within the chamber 40 cannot escape around the cooling plate 42 perimeter. A sheet of thin fibrous material 46 is draped over the outer surface of the cooling plate 42 and is secured at its upper end by a removable rod 48 which frictionally holds the fibrous material between its upper surface and the end unit 12. In a laboratory model, it was found that "Handiwipe" worked well as the fibrous material. The fibrous material 46 is disposed over the cooling plate 42 outer surface under a slight tension and secured at the bottom by a longitudinally extending strip 54 of PVC material which is press-fitted into a channel 56 provided in the inner surface of the end unit 12. A condensate collecting groove 58 is connected with the condensate drain 27.

The cooling plate 42 is cooled by cool salt water introduced into the chamber 40 through the coolant input duct 35 and removed through the coolant output duct 37. It is desirable that the cooling plate 42 outer surface be sufficiently depressed with respect to the inner surface 60 of the end unit 12 so that when the fibrous material 46 is draped over the outer surface of the plate 42, there will still be an offset between the inner surface 60 of the end unit 12 and the surface of the fibrous material 46. The purpose of this offset is to ensure that condensate flowing on and through the fibrous material 46 will not contact salt water flowing over the adjacent surface as will be explained below. It has been found in an experimental unit that an offset of 0.7 mm between the inner surface 60 of the end unit 12 and the exposed surface of the fibrous material 46 is sufficient to prevent any contamination of the condensate by the flowing salt water.

The warm end unit 14 is constructed identically to the cool end unit 12 with the exception that a hollow, stainless steel salt water input duct 24 replaces the removable rod 48, both having the same outside diameter however. The salt water input duct 24 secures fibrous material 70 in the same manner as the fibrous material is secured in the cool end unit 12. Input salt water to be desalinized is forced through a series of holes (not shown) in the top edge of the salt water input duct 24 and flows first to the fibrous material 70 and then downwardly through the fibrous material 70 in the same manner as the condensate flowed through the fibrous material 46 over the cooling plate 42. As the salt water flows downwardly, it becomes more concentrated and is collected at the bottom for removal through the salt water concentrate drain 38. The same offset of the surface of the fibrous material 70 with respect to the inner surface 71 of the warm end unit 14 is required as is provided for the cool end unit 12. A nickel-plated brass warming plate 72 is provided, the inner surface of the plate enclosing a chamber 73 within the end unit 14 and through which warm water flows via warm water input and output ducts 28 and 30, respectively, thereby warming the plate 72. As one can appreciate, the end units 12 and 14 comprise a complete apparatus for the separation of potable water from salt water. Although in this particular embodiment fibrous material has been utilized to ensure a smooth and even flow of condensate over the outer surface of the cooling plate 42, other means could be used for maintaining this flow. For example, the surface of the cooling plate 42 could have a hydrophilic finish to achieve filmwise condensation and/or could be formed with a plurality of grooves. The surface of the warming plate 72 could also be similarly treated.

Figure 4:
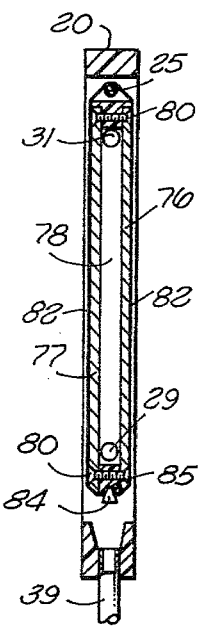
FIG. 4 is a cross-sectional view of a medial unit incorporating a warm surface.

In order to provide additional separation capability, an additional capacity assembly 16 can be placed between the cool end unit 12 and the warm end unit 14. Each added capacity assembly 16 consists of a cool medial unit 18 having a pair of cooling plates 74 and 75 and a warm medial unit 20 having a pair of warming plates 76 and 77. These cooling and warming plates 74, 75, 76 and 77 are also formed of nickel-coated brass. The warm surface assembly 20 is shown both in FIG. 2 and in cross-section in FIG. 4. The two warming plates 76 and 77 are centrally positioned within the medial unit 20 framework and spaced-apart so that a central chamber 78 is formed into which warm water is introduced via the warm water input duct 29 and removed via the warm water output duct 31. The warming plates 76 and 77 are secured to the unit 20 PVC framework by appropriate mounting screws 80 which are also flush with respect to the warming plate 76 and 77 outer surfaces. A single sheet of fibrous material 82 is draped over the top of the salt water input duct 25 and secured at the bottom by a holding strip 84 which is frictionally secured within a holding channel 85. The salt water input duct 25 is formed of stainless steel and has holes in its upper surface (not shown) through which the water to be desalinated flows. The salt water is absorbed by the fibrous material 82 and flows evenly down the outer surfaces of both warming plates 76 and 77, the salt water concentrate dripping from the bottom and being removed by the salt water concentrate drain 39.

The cool medial unit 18 is identical to the warm medial unit 20 except that a removable holding rod 86 is used in lieu of the salt water input duct 25. The two cooling plates 74 and 75 partially form a chamber 94, cool water entering via the coolant input duct 34 and exiting via the coolant output duct 36. In a manner similar to the warm medial unit 20, a sheet of fibrous material 96 is dependent from the holding rod 86, and extends downwardly over both of the cooling plate 74 and 75 outer surfaces and is frictionally secured at the bottom by a holding strip 98. Condensate forming on the cooling plates 74 and 75 flows downwardly through the fibrous material 96 and is removed by the condensate drain 26.

Cool and warm water within adjacent chambers 40, 78, 94 and 73 flow in countercurrent directions. Thus coolant entering the cool end unit chamber 40 enters through its coolant input duct 35 and flows downwardly to exit through the coolant output duct 37. However, warm water within the warm medial unit chamber 78 flows upwardly due to its entrance through the warm water input duct 29 and exit through the warm water output duct 31. The purpose of this opposite flow pattern is to maintain as constant a temperature differential as possible over the vertical length of the cooling and warming plates. As the cool water flows from top to bottom it is warmed slightly and as the warm water flows from bottom to top it is cooled slightly. A similar countercurrent pattern is maintained in the cool medial unit chamber 94 and the warm end unit chamber 73.

In operation, coolant is introduced into the cool end unit 12 via its coolant input duct 35 and the cool medial unit 18 via its coolant input duct 34 and removed via coolant output ducts 37 and 36, respectively. Warm water is introduced into the warm end unit 14 via its warm water input duct 28 and the warm medial unit 20 via its warm water input duct 29 and removed via warm water output ducts 30 and 31, respectively. Salt water to be desalinized is introduced via the two salt water input ducts 24 and 25, flows downwardly through the fibrous material 70 and 82 and over the warming plates 72, 76 and 77. Vapor consisting of pure water is emitted from these warming plates and condenses on the cooling plates 42, 74 and 75. The condensate flows downwardly and is collected by two condensate drains 26 and 27. The apparatus will operate with low temperature differentials between the plates and provides a means for utilizing heat energy which would otherwise be exhausted to the environment and wasted.

Figure 5:
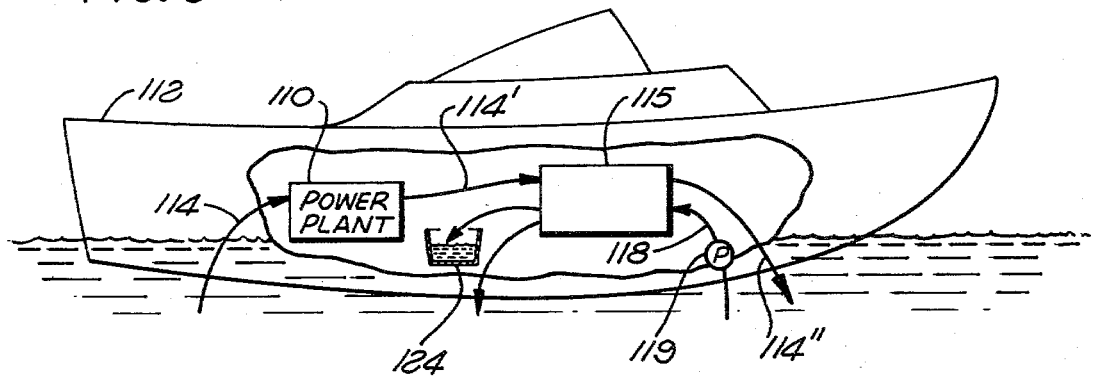
FIG. 5 illustrates use of the apparatus in an embodiment in which the heat of an engine is utilized.

The apparatus can be used in conjunction with a shipboard power plant as shown in FIG. 5. A heat-generating power plant 110, such as an internal combustion engine, is utilized to propel an ocean-going vessel 112. The power plant 110 draws in sea water 114 for internal cooling and expels warm sea water 114' subsequent to its being heated within the power plant 110.

The thus heated water 114', rather than being returned to the ocean, is cycled to a water purifying apparatus 115 according to the present invention, the apparatus 115 having an appropriate number of medial assemblies as previously described. The heated water 114' is used to heat the warming plates within the water purifying apparatus 115, the somewhat cooled water 114" being returned to the ocean. Ambient sea water 118 is provided to the apparatus 115 by a pump 119, the water being used both to cool the cooling plates and as the salt water to be purified. Concentrated sea water 122 is returned to the sea and the pure water condensate is stored in an appropriate collection container 124. Thus as one can see, a water purifying apparatus according to the present invention can be operated in conjunction with a shipboard power plant to utilize waste heat generated by the power plant to supply the fresh water needs of the ship.

Figure 6:
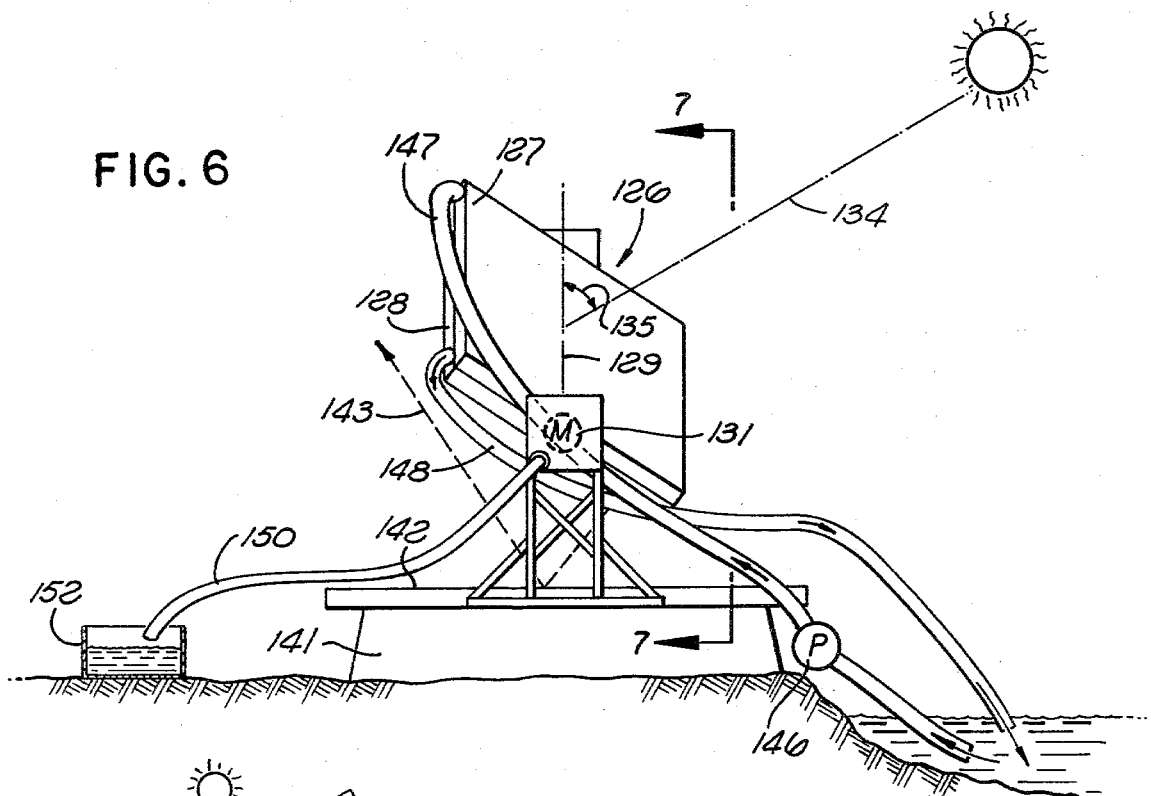
FIG. 6 is an elevational view of the apparatus in an embodiment in which heat is supplied by solar energy and cooling is effected by radiation.
Figure 7:
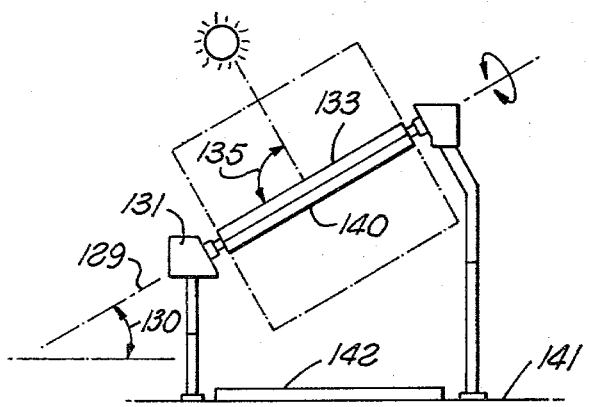
FIG. 7 is an elevational view taken along line 7—7 of FIG. 6.

Another embodiment of the invention utilizes solar energy for heating the warm surface plates. Referring to FIGS. 6 and 7, the water purifying unit 126 comprises a warm end unit 127 and a cool end unit 128, both of which are functionally equivalent to the corresponding structures of FIG. 1. The end units 127 and 128 are connected and mounted so that they can be rotated about an axis 129 parallel to the earth's axis, the cool and warm surfaces forming an angle 130 with respect to the local horizontal equal to the latitude of the installation. A motor 131 is provided which causes the water purifying unit to rotate about its axis 129 at a rate of one revolution per twenty four hours, the rotation being in the apparent direction of the sun across the sky. Thus if the outer surface 133 of the warm end unit is initially aligned perpendicular to the sun's rays 134 as shown at 135, then the motor 131 induced rotation will maintain this perpendicular alignment throughout the day. The outer surface 133 of the warm end unit 127 is coated with black paint so as to absorb sunlight. The outer surface 140 of the cool end unit 128 is coated with reflective metallic paint so as to reflect visible light and radiate long wave length radiation as a black body. To enhance efficiency of the long wave length radiation, the pedestal 141 of the purifying unit 126 can contain a polished metal reflector 142 to reflect the long wave length radiation from the cooling surface 140 to the sky as represented at 143. Although in this embodiment the long wave length radiation provides all of the cooling required, cool sea water could also be circulated as in the FIG. 1 embodiment, thereby providing an additional cooling capability. A salt water pump 146 provides input set water for purification via a water input duct 147, and salt water concentrate is removed via a salt water concentrate drain 148. Fresh water condensate is removed through a fresh water condensate drain 150 and collected in an appropriate storage container 152. Ducting within the apparatus 126 is not shown, but could be accomplished in many ways once the teachings of the invention as described above are understood.

An alternate arrangement for solar heating of the warm surface of the water purifying unit 126 would be to mount the unit 126 in a fixed vertical position with the warm unit surface 133 facing south (in the northern hemisphere). Sunlight from a distant large parabolic mirror would be reflected and focused on the warm unit surface 133. The parabolic mirror and other reflecting surfaces would be mounted and rotated so as to provide a continuous beam of sunlight focused on the warm unit surface 133 during daylight hours.

We claim:

1. An apparatus for the continuous separation of a volatile solvent from a solution of said solvent and a relatively non-volatile solute, comprising:
    means for defining a cool, extended surface;
    means for defining a warm, extended surface opposite said cool surface and spaced therefrom a predetermined distance;
    means for flowing solution over said warm surface comprising a sheet of thin fibrous material, means for disposing said sheet in direct contact with said warm surface, and means for releasing said solution above said warm surface for conduction by said sheet in a substantially continuous thin film over said warm surface confined thereon to define a continuous vapor gap between said warm and cool surfaces whereby to form a condensate on said cool surface; and
    means for recovering condensate formed on said cool surface separately from said solution, said predetermined distance being at least greater than the combined thickness of said flowing solution and said condensate.

2. An apparatus for the continuous separation of a volatile solvent from a solution of said solvent and a relatively non-volatile solute, comprising:
    means for defining a cool, extended surface;
    means for defining a warm, extended surface opposite said cool surface and spaced therefrom a predetermined distance;
    means for flowing said solution over said warm surface confined thereon to define a continuous vapor gap between said warm and cool surfaces whereby to form a condensate on said cool surface; and
    means for recovering condensate formed on said cool surface separately from said solution, comprising:
    a sheet of thin fibrous material, drain means, and means for disposing said sheet in direct contact with said cool surface whereby said condensate forms on said sheet and is conducted therethrough to said drain means;
    said predetermined distance being at least greater than the combined thickness of said flowing solution and said condensate.

3. A method for the continuous separation of a volatile solvent from a solution of said solvent and a relatively non-volatile solute, comprising:
    flowing said solution along a warm surface of a chamber;
    recovering solvent condensate formed on a cool surface of said chamber separately from said solution;
    positioning said warm surface a distance from said cool surface at least greater than the combined thickness of said flowing solution and said solvent condensate whereby to define a continuous vapor gap between said warm and cool surfaces.

4. The method of claim 3 in which said solution is alkaline, brackish or sea water and said solvent condensate is potable water.

5. The method of claim 3 in which said solution is maple syrup to be concentrated and said condensate is water.

* * * * *

UNITED STATES PATENT AND TRADEMARK OFFICE
CERTIFICATE OF CORRECTION

PATENT NO. : 4,233,153
DATED : November 11, 1980
INVENTOR(S) : Harold T. Hammel & James E. Maggert It is certified that error appears in the above-identified patent and that said Letters Patent are hereby corrected as shown below:

Column 1, line 41, delete "impeded" and substitute --impede--.

Column 4, line 37, delete "heating" and substitute --heat--.

Column 7, line 51, delete "set" and substitute --sea--.

Signed and Sealed this

Fourteenth Day of July 1981

[SEAL]

Attest:

Attesting Officer

GERALD J. MOSSINGHOFF

Commissioner of Patents and Trademarks